United States Patent [19]

Yang

[11] Patent Number: 5,762,092

[45] Date of Patent: Jun. 9, 1998

[54] HYDRAULIC PRESSURE-ACTUATED IRRIGATION WATER DISTRIBUTION VALVE APPARATUS

[75] Inventor: Woody Yang, No. 205. Chung-Chang Lane, Len-Li Tsune, Tien-Wei Hsiang, Changhua Hsien, Taiwan

[73] Assignees: Woody Yang; Shin-Tsung Young; Sheh-Ching Young, all of, Taiwan

[21] Appl. No.: 609,383

[22] Filed: Mar. 1, 1996

[51] Int. Cl.$^6$ ............................................. F16K 11/02
[52] U.S. Cl. ................... 137/119.03; 137/624.18; 137/625.11
[58] Field of Search ............... 137/119.03, 624.18, 137/625.11; 251/58, 230

[56] References Cited

U.S. PATENT DOCUMENTS

| | | | |
|---|---|---|---|
| 2,641,280 | 6/1953 | Fleischhauer | 137/625.11 X |
| 3,238,971 | 3/1966 | Cerone | 137/625.11 X |
| 3,524,470 | 8/1970 | Kah, Jr. et al. | 137/625.11 X |
| 3,529,618 | 9/1970 | Rinkewich | 137/625.11 X |
| 3,642,022 | 2/1972 | Kirby | 137/625.11 X |
| 3,730,208 | 5/1973 | Lewis | 137/625.11 X |
| 3,785,391 | 1/1974 | Miller | 137/625.11 X |
| 3,924,652 | 12/1975 | Kah, Jr. | 137/625.11 X |
| 4,077,424 | 3/1978 | Ehret et al. | 137/625.11 X |
| 4,109,670 | 8/1978 | Sloagel | 137/625.11 X |
| 4,235,254 | 11/1980 | Kirby | 137/624.18 X |
| 4,353,386 | 10/1982 | Slagel | 137/625.11 X |
| 4,407,451 | 10/1983 | Hunter | 137/624.14 X |

*Primary Examiner*—John Rivell
*Attorney, Agent, or Firm*—Michael D. Bednarek; Kilpatrick Stockton LLP

[57] ABSTRACT

A hydraulic pressure-actuated distribution valve apparatus is disclosed to have a valve body with a water entrance and a number of distribution water exits. The apparatus includes an irrigation water distribution valve mechanism that comprises a one-way clutch means that includes a rotating rod pivotally rotatable inside the valve body and a rotating disk engage with the rotating rod for one-way rotation. The distribution valve apparatus receives irrigation water supply from a pressurized water source through the water entrance and distributes the irrigation water via one of the water exits in an established water path. The apparatus is characterized in that a change in the hydraulic pressure build-up in the pressurized water supply actuates the rotation of the one-way clutch means for changing the water path connection from the entrance to a next of the distribution water exits, so that irrigation water distribution can be switched among several irrigation regions.

5 Claims, 5 Drawing Sheets

HYDRAULIC PRESSURE-ACTUATED IRRIGATION WATER DISTRIBUTION VALVE APPARATUS

BACKGROUND OF THE INVENTION

1. Field of the Invention

The present invention relates in general to a hydraulic pressure-actuated irrigation water distribution valve. In particular, the present invention relates to a hydraulic pressure-actuated irrigation water distribution valve that switches between its valve positions utilizing pressure change of the internal hydraulic pressure build-up.

2. Description of the Prior Art

Vast grass fields in places such as farms and golf courses require timely irrigation to maintain satisfactory grass conditions. Irrigation water is fluid whose flow is controlled utilizing valve devices such as pneumatically, hydraulically, or electrically-actuated valves. It is not uncommon to find large quantities of solid grains or other impurities in irrigation water that would eventually clog the valve for the distribution of irrigation water. This renders the reliability of these precision valves poorly dependable.

Open-gate valves may be used for the control of irrigation water distribution in flat and open locations. Since precision control mechanisms of these open-gate valves are not required to be submerged in irrigation water, there is therefore virtually no problem of clogging in their valve control mechanism. However, it is not always possible to find wide and flat locations to install this type of valve. Besides, in addition to the irrigation valve devices themselves, there are always more facilities such as irrigation pipelining, electric power lines, pneumatic pressure-supply lines and/or other hydraulic control pipelining passing through the site that complicate the situation and cause malfunctions. So far, automation in irrigation water control has been a problem.

SUMMARY OF THE INVENTION

It is therefore an object of the present invention to provide a hydraulic pressure-actuated irrigation water distribution valve means having simple and dependable mechanism for the control of irrigation water in wide fields that serves to distribute irrigation water from one source to several irrigation regions.

It is another object of the present invention to provide a hydraulic pressure-actuated irrigation water distribution valve means having simple and dependable mechanism that operates on the hydraulic pressure in the irrigation water to control the valve switching thereof for the distribution of irrigation water.

It is still another object of the present invention to provide a hydraulic accumulation valve means having simple and dependable mechanism that can be combined in number and actuated simultaneously to facilitate large area automated irrigation control under reduced cost.

The present invention achieves the above-identified objects by providing a hydraulic pressure-actuated distribution valve apparatus having a valve body with a water entrance and a number of distribution water exits. The apparatus includes an irrigation water distribution valve mechanism that comprises a one-way clutch means that includes a rotating rod pivotally rotatable inside the valve body and a rotating disk engage with the rotating rod for one-way rotation. The distribution valve apparatus receives irrigation water supply from a pressurized water source through the water entrance and distributes the irrigation water via one of the water exits in an established water path. The apparatus is characterized in that a change in the hydraulic pressure build-up in the pressurized water supply actuates the rotation of the one-way clutch means for changing the water path connection from the entrance to a next of the distribution water exits, so that irrigation water distribution can be switched among several irrigation regions.

The present invention further achieves the above-identified objects by providing a hydraulic pressure-actuated distribution valve apparatus wherein the one-way clutch means comprises a rotating rod pivotally rotatable inside the valve body; a piston slidably movable in along linear directions inside the valve body; a connecting rod having one end connected to a first end of the rotating rod and the other end connected to the piston; a first spring having one end connected to a second end of the rotating rod and the other connected to an inner edge of the valve body; a second spring compressibly installed between one end of the piston and the inner sidewall of the valve body; and a rotating disk having formed thereon a number of protruding projections, the projections being formed on the top surface of the rotating disk along the periphery of the rotating disk. A grab claw is formed on the second end of the rotating rod for engaging with any one of the protruding projections in one direction of rotation when the rotating rod is driven to rotate in one direction by the pressure change actuating the rotation of the one-way clutch means. The grab claw disengages with the projections in the other direction of rotation when the rotating rod is driven to rotate in the other direction of rotation by the pressure change actuating the rotation of the one-way clutch means.

BRIEF DESCRIPTION OF THE DRAWINGS

Other objects, features, and advantages of the present invention will become apparent byway of the following detailed description of the preferred but non-limiting embodiments. The description is made with reference to the accompanied drawings in which.

DETAILED DESCRIPTION OF THE PREFERRED EMBODIMENT

Figure 1:
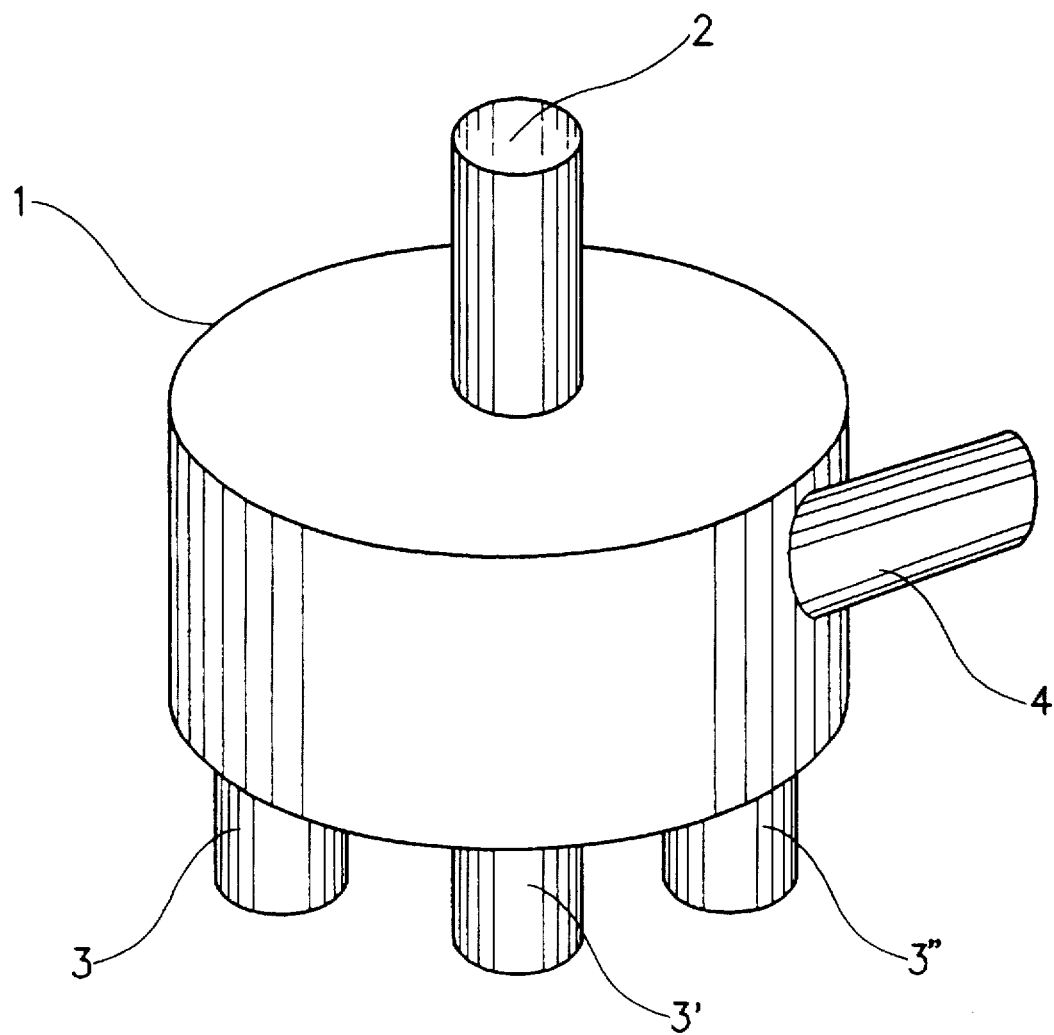
FIG. 1 is a perspective view of the hydraulic pressure-actuated irrigation water distribution valve in accordance with a preferred embodiment of the present invention.

Refer to FIG. 1 of the accompanying drawing of the present invention. A perspective view of the hydraulic pressure-actuated irrigation water distribution valve means in accordance with a preferred embodiment of the present invention is shown in the drawing. As is generally seen, the hydraulic distribution valve means of the present invention comprises a valve body 1 having a water entrance 2, a number of (more than one) water distribution exits 3, 3' and 3", as well as a side arm 4.

The valve body 1 houses the valve distribution operation control mechanism inside that serves to control the distribution of irrigation water incoming in via the water entrance 2 among the selected one of the multiple of irrigation water exits 3, 3' and 3". This allows for the irrigation water that is pumped from one source to be distributed over to one of several irrigation regions. All the regions connected to the hydraulic pressure-actuated irrigation water distribution valve means of the present invention, three in the case of the embodiment depicted in FIG. 1, may be subsequently irrigated upon the actuation of the valve mechanism inside the valve means to be described below by, for example, a change in the supply water pressure caused by the water supply pump.

For a description of the hydraulic pressure-actuated irrigation water distribution valve means of the present invention, the preferred embodiment shown in FIG. 1 is further detailed in three cross-sectional views taken along the planes perpendicular to the longitudinal axis of the cylindrical valve body 1 at the upper, center and bottom portions.

Figure 2:
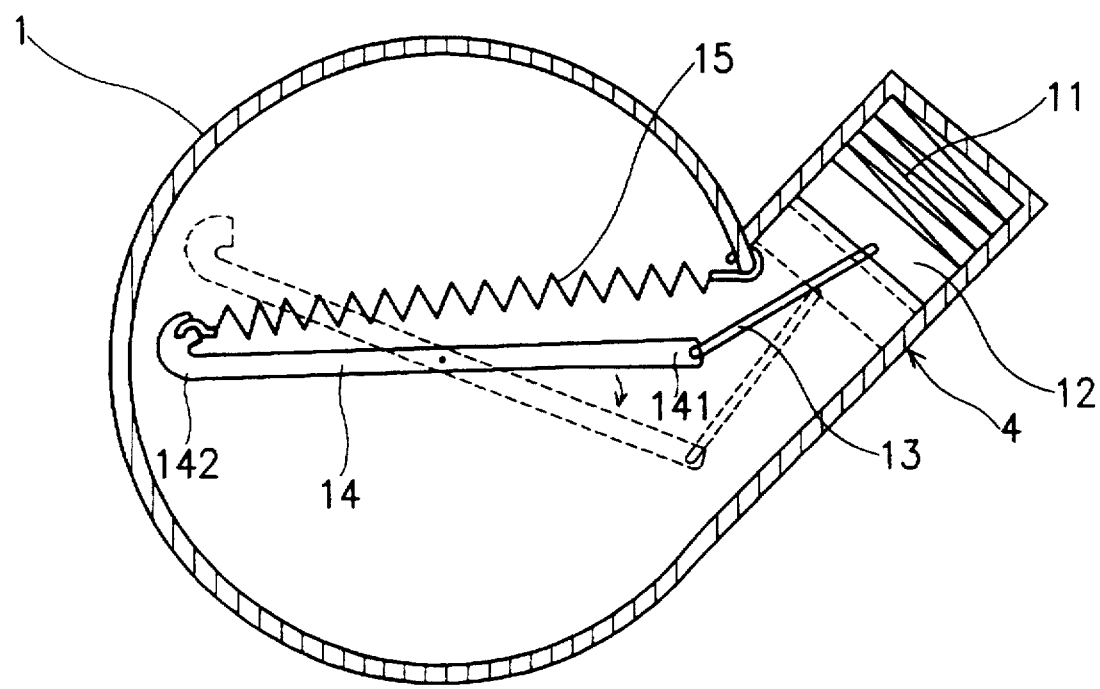
FIG. 2 is a cross-sectional view schematically showing the cross section of the upper portion of the hydraulic pressure-actuated irrigation water distribution valve.

Refer to FIG. 2. The cross-sectional view of the valve body 1 taken at the upper portion thereof is shown. As is seen in the cross-sectional view that generally cut through the side arm 4, the valve control mechanism comprises a rotating rod 14, a first spring 15, a connecting rod 13, a piston 12 and a second spring 11.

Inside the cavity surrounded by the casing of the valve body 1, a protruding edge at the intersection of the body 1 and the side arm 4 may be utilized to secure one end of the first spring 15, which has its other end fixed to the corresponding first end 142 of the rotating rod 14, as can be seen in the drawing. The rotating rod 14 is essentially pivoted at center to rotate inside the inner space of the valve body 1 in a plane parallel to the plane of the cross-sectional view of FIG. 2. The connecting rod 13 serves to connect the piston 12 and the rotating rod 14 at its second end 141 respectively at the opposite ends thereof. The connection of the rotating rod 14 and the piston 12 by the connecting rod 13 allows the three to act as a set of assembled mechanism. When the rotating rod 14 rotates, the connecting rod 13 transforms the rotational motion of the rod 14 into the reciprocating linear motion of the piston 12. Conversely, when the piston 12 reciprocates inside the cylindrical space of the side arm 4, its linear motion is transformed into the rotational motion of the rotating rod 14 inside the valve body 1.

Also, as is seen in the drawing, the piston 12 and the second spring 11 are essentially contained in the inner space of the side arm 4 in their entirety. The second spring 12 is compressedly housed inside the cylindrical inner space of the side arm 4, with its one end pressed against the remote inner end wall of the side arm 4 and the other against the facing end of piston 12.

Figure 3:
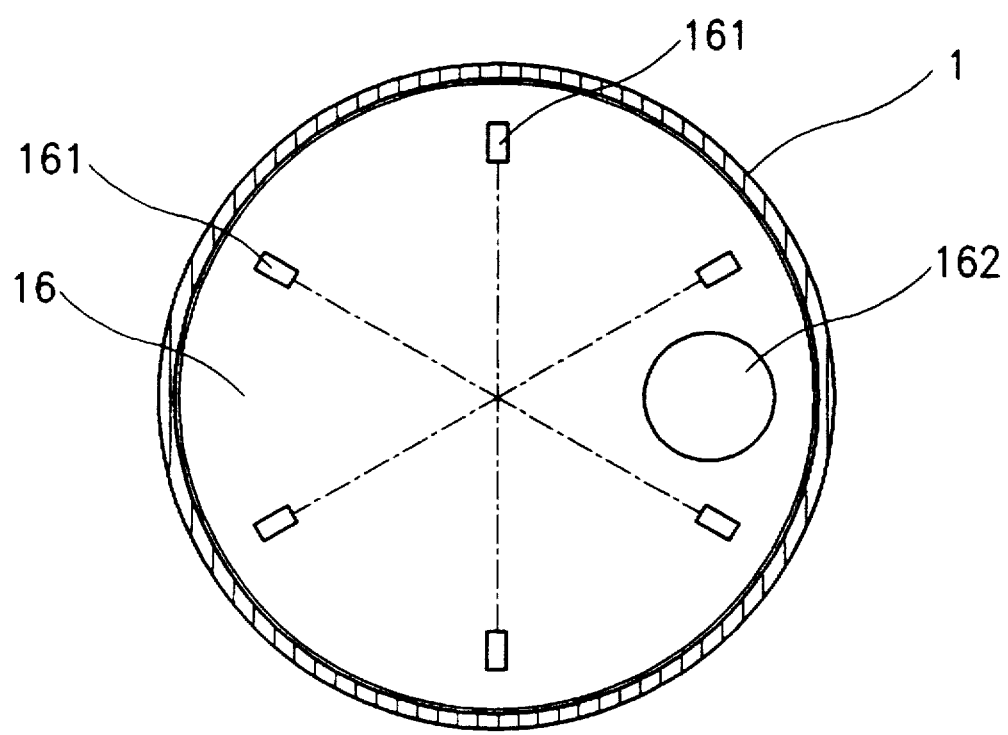
FIG. 3 is a cross-sectional view schematically showing the cross section of the center portion of the hydraulic pressure-actuated irrigation water distribution valve.

FIG. 3 is a cross-sectional view schematically showing the cross section of the center portion of the hydraulic pressure-actuated water irrigation distribution valve embodied in FIG. 1. A rotating disk 16 is seen to be installed inside the valve body 1 and allowed to rotate around the center axis of rotation, which is essentially the longitudinal axis of the valve body 1. Along the outer periphery of the disk 16, there are arranged a number, six in this example, of projections 161 that protrude above the surface of the disk 16. All the projections 161 are arranged to be formed at substantially the same radial location, and each is separated by substantially the same angular distance with its next projections at both sides on the disk 16. A first pass-through hole 162 is also formed in the plane of the rotating disk 16.

Figure 4:
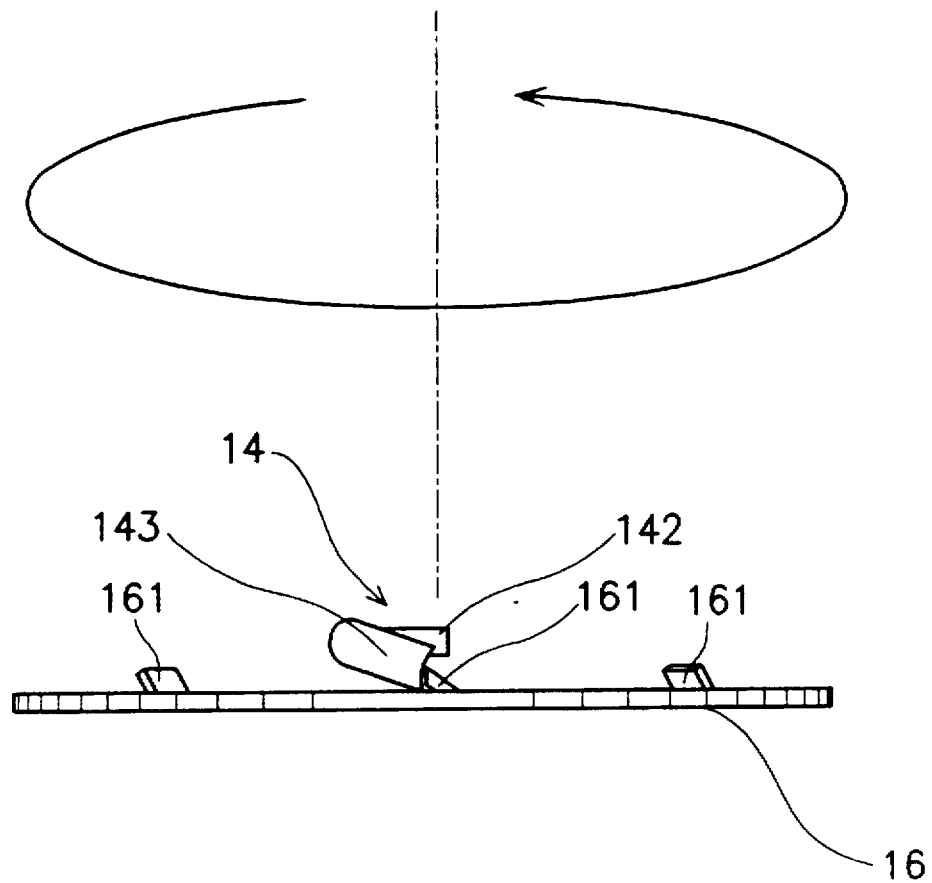
FIG. 4 is a side view schematically showing the interaction between the rotating rod and the rotating disk of the hydraulic pressure-actuated irrigation water distribution valve.

FIG. 4 is a side view that shows the interaction between the rotating rod 14 and the rotating disk 16 of the hydraulic pressure-actuated irrigation water distribution valve of the present invention. This side view shows that the rotating disk 16 has the projections 161 rising above the top surface of the disk 16, and one of the projections 161, i.e., the center one shown in the drawing, is seen to be engaged with a grab claw 143 that extends slightly downwardly from the first end 142 of the rotating rod 14.

As is clearly depicted in the drawing, the engagement between the grab claw 143 and the protruding projection 161 allows the two to become a one-way clutch mechanism. In other words, when the rotating rod 14 is driven along the counterclockwise direction as shown by the circular arrow in the drawing, the rotating disk 16 is allowed to be driven along in the counterclockwise direction. On the other hand, when the rotating rod 14 is driven in the clockwise direction, the grab claw 143 of the rod will be able to slide atop the projection 161, leaving the rotating disk 16 not driven along in the clockwise direction of rotation. This requires that the projections 161 formed over the top surface of the rotating disk 16 to have a shape which rises in a smooth contour along the clockwise direction of rotation on the surface of the disk 16. Meanwhile, at the other side of the projection 161 opposite the smoothly rising surface, there is formed a generally concave space that allows for the firm engagement with the grab claw 143 when the rotating rod 14 is driving the two engaged components in the counterclockwise direction of rotation. Protruding projections 161 necessarily having a shape as described above may be formed by, for example, press-punch machining on the disk plane of the disk 16 to bend a small piece of generally rectangular plate that tilts as shown in the drawing.

Figure 5:
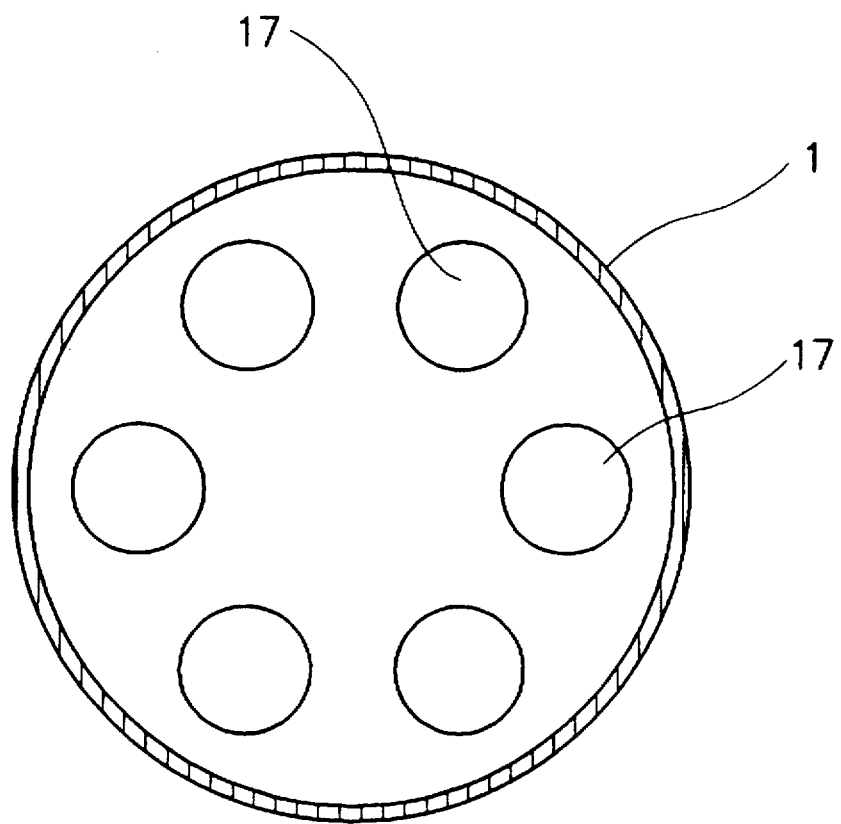
FIG. 5 is a plain view showing the bottom section of the hydraulic pressure-actuated irrigation water distribution valve.

FIG. 5 is a plain view showing the bottom section of the hydraulic pressure-actuated irrigation water distribution valve. A number of second pass-through holes 17 are arranged along the periphery of the bottom plate of the valve body 1. Each of these second pass-through holes 17 is the entrance to the irrigation water exits 3, 3', 3" as well as those not shown in the perspective view of FIG. 1. Essentially, the location of these second pass-through holes 17 are at a location having the same radial distance from the center of the circular bottom plate of the body 1. This allows for the first pass-through hole formed in the rotating disk 16 to be rotatingly aligned with any one of the second pass-through holes 17 on the bottom plate.

When the valve body 1 of the hydraulic pressure-actuated irrigation water distribution valve of the present invention is fed with irrigation water by a pumping device (not shown in the drawing) via the water entrance 2, the positive water pressure inside the body 1 will compress the piston 12 toward the longitudinal direction of the side arm 4 away from the center of the body 1. The level of compression achieved on the second spring 11 is reflected by a position determined by the compression coefficients of the first and second springs 15 and 11 and the pressure built up by the water supply pump, since the first spring 15 is attached to the other end of the rotating rod 14. Assuming, when the water pressure in present, the piston 12 is balanced at the location shown in FIG. 2 by solid lines.

Referring again to FIG. 2, when the irrigation water supply pump is shut down, the hydraulic pressure suddenly disappears inside the valve body 1. This allows the second spring 11 to extend, pushing the piston 12 inward toward the cavity of the valve body 1. The first spring 15 also helps in this return of the piston 12 as it will contract when the hydraulic pressure disappears. The rotating rod 14 rotates in the clockwise direction, which allows the grab claw 143 at the first end 142 of rod 14 to also rotate along the same clockwise direction of rotation, as is seen in FIG. 4.

During the period when irrigation water supply pump is shut down, the rotating rod 16 may be driven to the location as shown in FIG. 2 by the phantom lines as a result of the elimination of the hydraulic pressure inside the valve body 1. Meanwhile, better shown in FIG. 4, the grab claw 143 will slide over the top of the projection 161 right next to it as the rotating rod 14 is driven in the clockwise direction. This leaves the rotating disk 16 not driven along, and it remains in its current angular position.

When, however, the power supply to the water pump is resumed again, the rotating rod 14 may then be driven to the location as shown in FIG. 2 by the solid lines, because the hydraulic pressure is again building up inside the valve body 1. The grab claw 143 formed at the end 142 of the rotating rod 14 may grab the very projection 161 rising above the surface of the rotating disk 16, causing the disk 16 to rotate along with the rod 14 also in the counterclockwise direction, as is also schematically shown by the counterclockwise arrow in the drawing. At this moment, the rotating disk 16 will have been rotated one angular position in the counterclockwise direction, allowing the pass-through hole 162 formed in the disk 16 to also advance one corresponding angular position, which makes it aligned with a next pass-through hole 17 formed in the bottom plate shown in FIG. 5.

Since, as described above, each of the pass-through holes 17 formed in the bottom plate of the valve body 1 is the entrance to one corresponding and independent water exit from the distribution valve device, once the water supply pump is turned on again to continue the supply of irrigation water, the valve device will now distribute the water supply to another irrigation region connected by the newly aligned pass-through hole.

Meanwhile, since the hydraulic pressure is again built up inside the valve body 1, the piston 12 will again be pressed outward, the rotating rod 14 is then driven counterclockwise and returned to the position shown in the solid lines in FIG. 2. As described above, an equilibrium position determined by the presence of the first and second springs 15 and 11 and the pressured water is again achieved.

When the rotating rod 14 is driven clockwise again by another short period of pump shut down, the rotating disk 16 will not be driven along. As described above, the grab claw 143 at the first end 142 of the rod 14 slides over the top of the projection 161 just next to it. And when the pump power is applied again, the rotating disk 16 is advance one position again, connecting the source of irrigation water to a next irrigation region. This procedure can be continued indefinitely, and the irrigation water may then be distributed among the different required irrigation regions. The only necessary action to achieve this switching of irrigation region is the change of hydraulic pressure in the irrigation water. Usually, this can be achieved by simply turning off and on again the power supply to the water pump.

The hydraulic pressure-actuated irrigation water distribution valve means disclosed above in the exemplified embodiment is not for the limitation of the scope of the disclosure of the present invention. Modifications and changes to the disclosed embodiment may be made without departing from the scope of the present invention. For example, the one-way clutch movement of the rotating disk can be accomplished by the irrigation water supply pump is turned off rather than turned on.

What is claimed is:

1. A hydraulic pressure-actuated distribution valve apparatus having a valve body with a water entrance and a plurality of distribution water exits, said apparatus includes an irrigation water distribution valve mechanism comprising:

a one-way clutch means that includes a rotating rod pivotally rotatable inside said valve body and a rotating disk engage with said rotating rod for one-way rotation; wherein said distribution valve apparatus receives irrigation water supply from a pressurized water source through said water entrance and distributes said irrigation water via one of said plurality of water exits in an established water path, and a change in the hydraulic pressure built-up in said pressurized water supply actuates the rotation of said one-way clutch means for changing the water path connection from said exits wherein said one-way clutch means comprising:

a piston slidable movable in along linear directions inside said valve body, a connecting rod having one end connected to a first end of said rotating rod and the other end connected to said piston, a first spring having one end connected to a second end of said rotating rod and the other connected to an inner edge of said valve body;

a second spring compressibly installed between one end of said piston and the inner sidewall of said valve body, and wherein the rotating disk has formed thereon a plurality of protruding projections, said plurality of projections being formed on a top surface of said rotating disk wherein:

a grab claw is formed on said second end of said rotating rod for engaging with any one of said plurality of protruding projections in one direction of rotation when said rotating rod is driven to rotate in one direction by said pressure change actuating the rotation of said one-way clutch means, and said grab claw disengages with said projections in the other direction of rotation when said rotating rod is driven to rotate in said other direction of rotation by said pressure change actuating the rotation of said one-way clutch means.

2. The hydraulic pressure-actuated distribution valve apparatus of claim 1, wherein said plurality of protruding projections formed on the top surface of said rotating disk are located at the same radial distance from the center of said rotating disk.

3. The hydraulic pressure-actuated distribution valve apparatus of claim 2, wherein said plurality of protruding projections formed on the top surface of said rotating disk are separated from the next projection at both sides thereof with equal angular distance.

4. The hydraulic pressure-actuated distribution valve apparatus of claim 3, wherein said valve body further comprises a side arm for housing said piston and said second spring, said piston may move along a cylindrical inner space of said side arm when pushed and pulled inside said valve body by said pressure change.

5. The hydraulic pressure-actuated distribution apparatus of claim 4, wherein said second spring is located between said piston and the inner wall of said side arm.

* * * * *